United States Patent [19]

Niikura

[11] Patent Number: 4,763,146
[45] Date of Patent: Aug. 9, 1988

[54] COMPOSITE CAMERA APPARATUS

[75] Inventor: Tsutomu Niikura, Kanagawa, Japan

[73] Assignee: Sony Corporation, Tokyo, Japan

[21] Appl. No.: 9,813

[22] Filed: Feb. 2, 1987

[30] Foreign Application Priority Data

Feb. 6, 1986 [JP] Japan ................................. 61-24690

[51] Int. Cl.$^4$ ........................................... G03B 29/00
[52] U.S. Cl. ..................................................... 354/75
[58] Field of Search ........................... 354/75, 76, 219

[56] References Cited

U.S. PATENT DOCUMENTS

3,883,883  5/1975  Sano et al. .......................... 354/75
4,303,322 12/1981  Someya ........................... 354/219 X
4,618,239 10/1986  Sakamoto ......................... 354/76 X
4,676,619  6/1987  Woolley ........................... 354/76 X Primary Examiner—Michael L. Gellner
Attorney, Agent, or Firm—Philip M. Shaw, Jr.

[57] ABSTRACT

A composite television/film camera in which, in one embodiment, a movable mirror provided for selectively permitting the light having passed through the lens to be incident upon either a photosensitive film or the light receiving surface of a television camera. When the mirror is repositioned to divert light to the film, a predetermined segment of the video signal which immediately preceded the repositioning of the mirror is read from an electronic memory and is outputted as the video signal so that no apparent interruption of the video signal occurs when a film exposure is being made.

10 Claims, 3 Drawing Sheets

COMPOSITE CAMERA APPARATUS

BACKGROUND OF THE INVENTION

1. Field of the Invention

The present invention relates to a composite camera apparatus functioning as a film camera and a video camera and, more particularly, to an apparatus containing a video camera portion for producing a video signal representing a moving subject and a film camera portion for taking still image photographs of a subject.

2. Description of the Prior Art

In a video camera, light passing through an object lens from the moving subject impinges on a light receiving surface of an image pickup device, such as an image pickup tube or a solid state image pickup element, and forms images thereon. A video signal is produced based on a pickup output signal which is obtained from the image pickup device in response to such images. The video signal thus obtained is, for example, thereafter recorded on a record medium such as a magnetic tape for later reproduction from the record medium for displaying moving pictures on a display device.

In comparison with a video camera, a film camera, in which light from a subject is focussed onto a photosensitive film and still images of the subject are formed upon the photosensitive film, has in general the advantage of providing still pictures of superior quality. In various cases, however, both the video camera and the film camera are used selectively. However, there is an inconvenience to a person who uses both a video and a film camera in that he has to transport and position two independent camera apparatus.

OBJECTS AND SUMMARY OF THE INVENTION

Accordingly, it is an object of the present invention to provide a composite camera apparatus which avoids the aforementioned inconveniences in conventional use of both a video camera and a film camera.

Another object of the present invention is to provide a composite camera apparatus which can function as a video camera and as a film camera as selected by a user.

A further object of the present invention is to provide a composite camera apparatus which contains in a single case a video camera portion and a film camera portion.

In accordance with the present invention, there is provided a composite camera apparatus comprising: lens means upon which light from a subject is incident, film holding means for supporting a photosensitive film upon which an image of the subject is formed by the light having passed through said lens means, image pickup means provided with a light receiving surface upon which an image of the subject is formed by the light having passed through said lens means for producing a pickup output signal in response to the image formed upon the light receiving surface, video signal generating means connected to said image pickup means for producing a video signal based on the pickup output signal obtained from said image pickup means, and video signal processing means connected to said video signal generating means for producing a processed video signal appropriate for magnetic recording based on said video signal.

In some embodiments, magnetic recording means contained within the camera housing is connected to said video signal processing means for recording said processed video signal on a magnetic tape.

In a first embodiment of a composite camera apparatus according to the invention, a film camera mechanism including a film holder, film transmitting device, shutter, shutter driving device and so on is combined with a video camera arrangement containing an image pickup device, video signal generating circuit and so on, so that a still image of a subject can be formed upon a photosensitive film supported by the film holder at the instant at which the shutter is opened by the shutter driving device while at the same time the video camera arrangement is in operation for producing a video signal representing the subject.

In such a composite camera apparatus by which not only a video signal representing a subject is produced but also a photographic still image of the subject in a selected cut of movements thereof is taken, the video camera arrangement and the film camera mechanism are combined with each other to be accompanied with a lens device provided in common to both the video camera arrangement and the film camera mechanism. A light splitter of, for example, the mirror type divides the light entering into the apparatus through the lens device from the subject into a couple of light components, one of which is incident upon a light receiving surface of the image pickup device in the video camera arrangement and the other of which is incident upon the photosensitive film in the film camera mechanism. The image pickup operation of the video camera arrangement and the photographing operation of the film camera mechanism can be performed more or less independently of each other.

The use of such a beam splitting mirror, however, has the disadvantage that the light from the subject is attenuated by the mirror, so that each image formed respectively on the light receiving surface of the image pickup device and the photosensitive film is reduced in brightness. Therefore, the minimum illumination of the subject required for a proper operation of the video and film camera arrangements is increased from that which would be necessary for the cameras operating separately and, as a result, the image of a subject in a relatively dark scene may not be properly picked up by the video camera arrangement nor properly photographed by the film camera mechanism.

According to a second embodiment of the invention, there is provided a composite camera apparatus in which such a film camera mechanism as aforementioned is combined with such a video camera arrangement as also aforementioned to be accompanied with a lens device provided in common to both the video camera arrangement and the film camera mechanism but with the light passing through the lens device being selectively directed by a movable mirror, instead of a light splitter, to the light receiving surface of the image pickup device in the video camera arrangement and the photosensitive film in the film camera mechanism. With use of such a movable mirror, the aforesaid difficulty encountered with the composite camera apparatus employing the light splitter as mentioned above is eliminated.

However, the movable mirror creates another disadvantage in that, in the case where the movable mirror is moved to guide the light from the subject to the photosensitive film while at the same time the video camera is in operation for producing a video signal representing the subject, the pickup output signal is not obtained from the image pickup device in the video camera arrangement and therefore the video signal is interrupted. Such an interruption deteriorates the quality of the video signal obtained from the video camera arrangement. It is possible to compensate a little for this deterioration in quality of the video signal by adding a video signal having a predetermined level, for example, a video signal of a gray level to the interrupted portion of the video signal, but the compensation made in such a manner is insufficient.

To overcome the above described disadvantages, in a preferred embodiment of the invention, the mirror is selectively movable between a first position, for guiding the light having passed through the lens means to the image pickup means, and a second position, for guiding the light having passed through the lens means to the photosensitive film. A mirror controller causes the movable mirror to be disposed at the second position and to stay thereat during a predetermined period whenever the film camera operation is carried out. A memory stores successive segments of the pickup output signal obtained from the image pickup means or of a video signal obtained based upon the pickup output signal and a video signal generating circuit is connected to both the image pickup means and the memory. The mirror controller is selectively operative by the user of the camera to cause the movable mirror to move to the second position in synchronism with a period which corresponds to a vertical blanking period in the video signal obtained based upon the pickup output signal from the image pickup means. The memory is operative to store alternate predetermined segments, such as two frames, of said signal in such a manner that each segment is renewed when the movable mirror is disposed at the first position and to permit the stored segment to be read therefrom when the movable mirror is disposed at the second position. The video signal generating circuit is operative to generate the video signal in response to the pickup output signal obtained from the image pickup means or the pickup output signal read from the memory.

In the composite camera apparatus thus constituted in accordance with the present invention, the movable mirror is usually at the first position and is at the second position when a still film photo is to be taken. In the case where the movable mirror is at the first position, the light from the subject having passed through the lens means is guided to the light receiving surface of the image pickup means and the pickup output signal is obtained from the image pickup means to be supplied to the video signal generating circuit. Then, the predetermined segments of the pickup output signal obtained from the image pickup signal or the video signal generated based on the pickup output signal in the video signal generating circuit are stored in the memory successively in such a manner that each segment is replaced by a successive one. Further, the video signal generated based on the pickup output signal is derived from the video signal generating circuit.

When the film camera operation is to be carried out, as indicated by a control switch activated by the user of the camera, the mirror controller causes the movable mirror to be moved to the second position in synchronism with the next occurring vertical blanking period in the video signal obtained from the image pickup means, and then keeps the movable mirror at the second position for a period of time corresponding to the time required to read the stored segment from the memory.

When the movable mirror is at the second position, the light from the subject having passed through the lens means is guided to the photosensitive film so that a still image of the subject is formed upon the same. At this time, although the pickup output signal is not obtained from the image pickup means, the pickup output signal or the video signal stored in the memory is read from the memory and supplied to the video signal generating circuit instead of to the pickup output signal from the image pickup means. Consequently, a video signal is continuously obtained from the video signal generating circuit even in the periods when the movable mirror is kept at the second position for the still film picture operation. Furthermore, the light is unattenuated in passing from the lens means to said film and said image pickup means.

In the manner described above, the light from the subject which passes through the lens means is incident selectively upon the light receiving surface of the image pickup means and the photosensitive film without being substantially attenuated and the still image of the subject is formed properly on the photosensitive film while the video signal is continuously obtained from the video signal generating circuit without being deteriorated in quality by interruptions. Further, since the shift of the movable mirror from the first position to the second position is carried out in the period corresponding to the vertical blanking period in the video signal obtained from the video signal generating circuit, the video signal derived from the video signal generating circuit is prevented from having undesirable variations resulting from positional shifts of the movable mirror.

The above, and other objects, features and advantages of the present invention will become apparent from the following detailed description which is to be read in conjunction with the accompanying drawings.

DESCRIPTION OF THE PREFERRED EMBODIMENTS

The invention will now be described by way of example with reference to the accompanying drawings.

Figure 1:
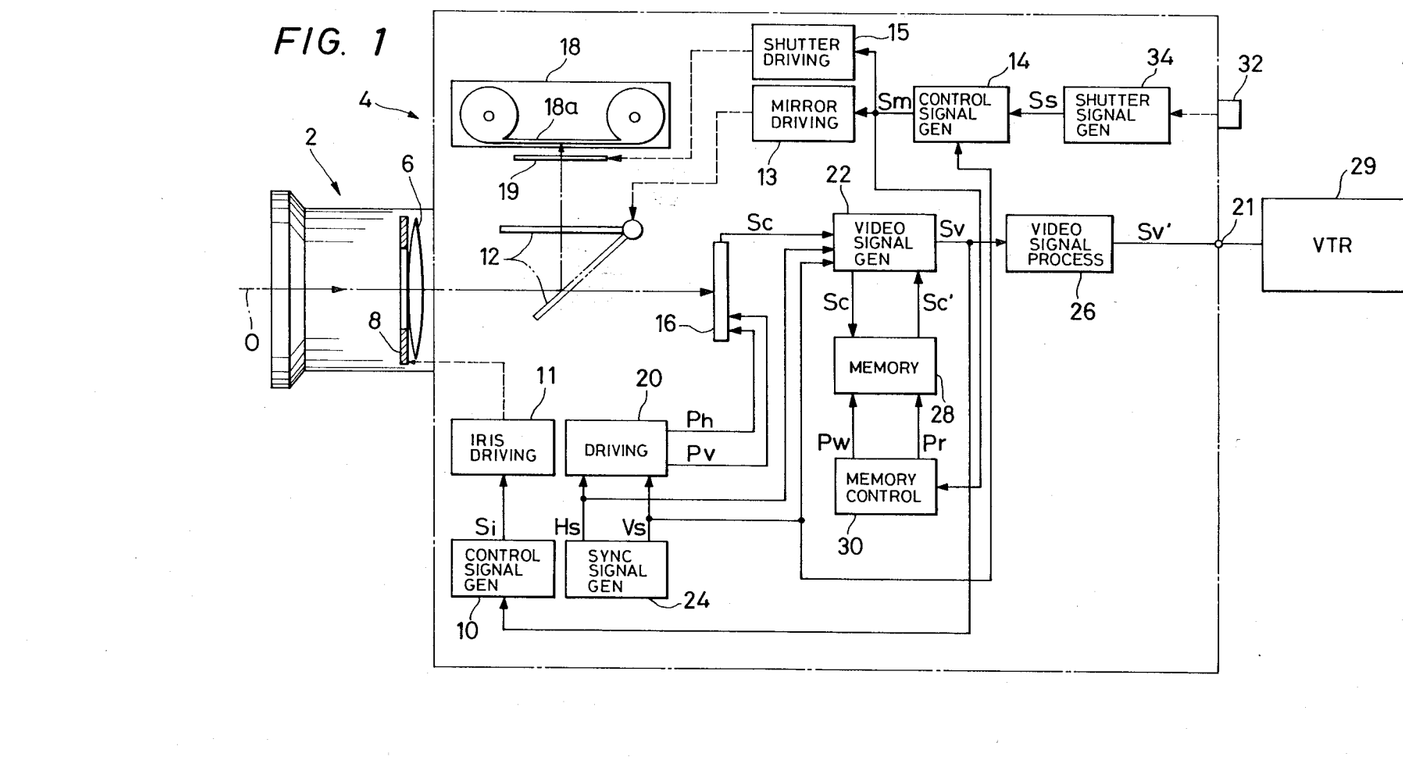
FIG. 1 is a block diagram showing one embodiment of composite camera apparatus according to the present invention.

Referring to FIG. 1 showing one embodiment of composite camera apparatus according to the present invention, a lens portion 2 and a body portion 4 to which the lens portion 2 is removably attached are provided. In the lens portion 2, a lens device 6 is provided and an iris diaphragm 8 is disposed in front of the lens device 6 for limiting the amount of light incident upon the lens device 6 from a subject (the light from the subject is indicated with a dot-dash line 0 in FIG. 1). As will be explained in detail further herein, the iris diaphragm 8 is automatically controlled by an iris driving mechanism 11, which is contained in the body portion 4, in response to the brightness of the subject to variably limit the light coming from the subject. The iris driving mechanism 11 operates in response to an iris control signal Si supplied thereto from a control signal generating circuit 10, which is also contained in the body portion 4.

A movable mirror 12 is positionable selectively at a first position, indicated with a solid line in FIG. 1, and a second position, indicated with a double dot-dash line in FIG. 1. For example, the movable mirror 12 is placed at the first position when a mirror control signal Sm, which is supplied to a mirror driving mechanism 13 from a control signal generating circuit 14, has a predetermined low level and at the second position when the mirror control signal Sm has a predetermined high level. A mirror control portion is thus formed of the mirror driving mechanism 13 and the control signal generating circuit 14.

When the mirror is in the first position, an image pickup device 16, for example a charge coupled device (CCD) image pickup element of the ⅔ inches type, is provided at a position where the light 0 from the subject, having passed through the lens device 6, is incident upon a light receiving surface of the image pickup device 16 When the mirror 12 is in the second position, the light 0 from the subject, having passed through the lens device 6, is reflected by the mirror 12 to a film holder 18 upon which a photosensitive film 18a is loaded. Whichever the position of the mirror, the light having passed through the lens device 6 is unattenuated in reaching either the film 18a or the image pickup device 16.

It is desirable to use a film 18a having a frame size corresponding to the size of the light receiving surface of the image pickup device 16, such as, for example, a film having a frame width of sixteen millimeters. In the case where an optical system for adjusting the frame size on a film is provided, it is possible to use a film 18a having a frame size greater than the size of the light receiving surface of the image pickup device 16, such as a film having a frame width of thirty-two millimeters. If film 18 a having a frame size corresponding to the size of the light receiving surface of the image pickup device 16 is used, it is not necessary to use an optical system operative to cause each exposed area on the photosensitive film 18 a to be coincident in size with an exposed area on the light receiving surface of the image pickup device 16.

A shutter 19 which is operative to limit the duration of the period during which the light 0 is incident upon the photosensitive film 18a is provided in front of the film holder 18. This shutter 19 is controlled by a shutter driving mechanism 15 to which the mirror control signal Sm is supplied from the control signal generating circuit 14 and is normally closed. It is opened to permit the light 0 to be incident upon the photosensitive film 18a for a selected period after the mirror control signal Sm is given a predetermined high level.

A vertical transferring pulse signal Pv and a horizontal transferring pulse signal Ph are supplied to the image pickup device 16 from a driving circuit 20. An electronic charge produced in response to the light 0 incident upon the light receiving surface is transferred in accordance with the vertical and horizontal transferring pulse signals Pv and Ph in the image pickup device 16, so that a pickup output signal Sc is generated in response to images of the subject formed upon the light receiving surface. The signal Sc is output from the image pickup device 16. The timing of the vertical and horizontal transferring pulse signals Pv and Ph is controlled, respectively, by vertical and horizontal synchronous signals Vs and Hs supplied to the driving circuit 20 from a synchronous signal generating circuit 24.

A video signal generating circuit 22 is supplied with the pickup output signal Sc, and a memory 28 is connected to the video signal generating circuit 22. The video signal generating circuit 22 includes a sample and holding circuit, an automatic gain control circuit, a pre-emphasis circuit, a clamping circuit and so on, which are not shown. The vertical and horizontal synchronous signals Vs and Hs are also supplied to the video signal generating circuit 22, and a video signal Sv is produced by it based on the pickup output signal Sc from the image pickup device 16 and the vertical and horizontal synchronous signals Vs and Hs from the synchronous signal generating circuit 24.

When the movable mirror 12 is placed at the first position, i.e. when only the video camera operation is taking place, the pickup output signal Sc is obtained from the image pickup device and each predetermined segment of the pickup output signal Sc corresponding to, for example, two successive field periods is written successively in the memory 28 so as to be stored therein. Each stored segment is replaced by the next successive segment in accordance with a writing pulse signal Pw supplied to the memory 28 from a memory control circuit 30. When the movable mirror 12 is placed at the second position for film camera operation and the pickup output signal Sc can not be obtained from the image pickup device 16, the last stored segment of the pickup output signal Sc is read from the memory 28 in accordance with a reading pulse signal Pr supplied to the memory 28 from the memory control circuit 30. The signal thus read from memory 28 is supplied to the video signal generating circuit 22 as a supplemental pickup output signal Sc'. The timing for the supply of the supplemental pickup output signal Sc' to the video signal generating circuit 22 from the memory 28, that is, the timing for the supply of the reading pulse signal Pr to the memory 28 from the memory control block, substituting for the supply of the writing pulse signal Pw, is controlled in accordance with mirror control signal Sm supplied to the memory control circuit 30 from the control signal generating circuit 14, so that the stored segment of the pickup output signal Sc stored in the memory 28 is read from the memory 28, for example, when the mirror control signal Sm is given the predetermined high level.

In the period in which the supplemental pickup output signal Sc' is supplied to the video signal generating circuit 22 from the memory 28, the video signal generating circuit 22 produces the video signal Sv based on the supplemental pickup output signal Sc' and the vertical and horizontal synchronous signals Vs and Hs. The video signal Sv thus generated from the signal Sc obtained from the image pickup device 16 or the signal Sc' read from the memory 28 is supplied to a video signal processing circuit 26.

In the video signal processing circuit 26, for example, a luminance signal is separated from the video signal Sv and used for frequency-modulating a predetermined carrier so as to produce a frequency modulated luminance signal, and a chrominance signal is also separated from the video signal Sv and frequency-converted to be a frequency converted chrominance signal. The frequency modulated luminance signal and the frequency converted chrominance signal are mixed with each other to produce a processed composite video signal Sv' which is delivered to an output terminal 21. Then, the processed composite video signal Sv' obtained from the output terminal 21 is supplied, for example to a video tape recorder 29 to be recorded on a magnetic tape therein. The video signal Sv obtained from the video signal generating circuit 22 is supplied also to the control signal generating circuit 10. The control signal generating circuit 10 produces an iris control signal Si, having a level which varies in response to the peak level of the video signal Sv, and supplies the signal Si to the iris driving mechanism 11.

Further, a shutter button 32 is provided on the body portion 4 for causing the shutter 19 positioned between the movable mirror 12 and the photosensitive film 18a to operate. When the shutter button 32 is operated, a shutter signal Ss is supplied to the control signal generating circuit 14 from a shutter signal generating circuit 34 to which the shutter button 32 is coupled. The control signal generating circuit 14 is further supplied with the vertical synchronous signal Vs from the synchronous signal generating circuit 24. When the shutter signal Ss is supplied to the control signal generating circuit 14, the control signal generating circuit 14 causes the mirror control signal Sm to have the predetermined high level and supplies the signal Sm to the mirror driving mechanism 13, shutter driving mechanism 15 and memory control circuit 30 in synchronism with the next vertical synchronous signal Vs which is received by the control signal generating circuit 14.

Figure 2A:
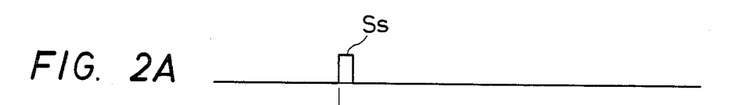
FIGS. 2A to 2E are waveform diagrams used for explaining the operation of the embodiment shown in FIG. 1.
Figure 2B:
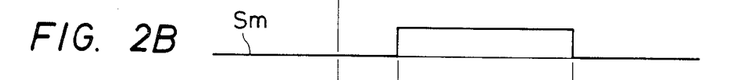
Figure 2C:
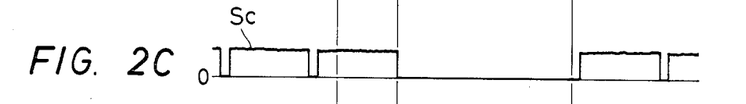
Figure 2D:
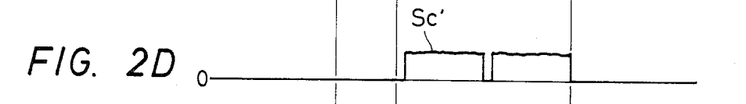
Figure 2E:
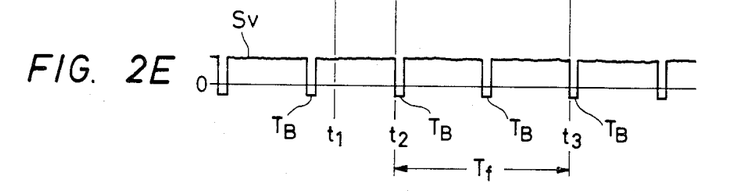

Referring now to FIGS. 2A–2E, assuming that the shutter button 32 is not operated until a time point $t_1$ and the shutter signal Ss is not sent out from the shutter signal generating circuit 34 until the time point $t_1$, as shown in FIG. 2A, the mirror control signal Sm has a predetermined low level as shown in FIG. 2B and therefore the movable mirror 12 is kept at the first position indicated with the solid line in FIG. 1 before the time point $t_1$. Thus, prior to the time point $t_1$, the light 0 from the subject having passed through the lens device 6 is incident upon the light receiving surface of the image pickup device 16 and the pickup output signal Sc containing successive field period components, as shown in FIG. 2C, is obtained from the image pickup device 16 and supplied to the video signal generating circuit 22. The video signal generating circuit 22 delivers the pickup output signal Sc to the memory 28, so that each successive segment, corresponding to successive two field periods, of the pickup output signal Sc is written successively in the memory 28 so as to be stored therein. Each stored segment is renewed, i.e. is replaced by successive segments written into the memory 28, in accordance with the writing pulse signal Pw supplied from the memory control circuit 30. The video signal generating circuit 22 simultaneously produces the video signal Sv, as shown in FIG. 2E, based on the pickup output signal Sc and the vertical and horizontal synchronous signals Vs and Hs from the synchronous signal generating circuit 24. The video signal Sv is supplied to both the control signal generating circuit 10 and the video signal processing circuit 26.

The control signal generating circuit 10 supplies the iris control signal Si, having a level varying in response to the peak level of the video signal Sv, to the iris driving mechanism 11 for controlling the iris diaphragm 8 as a function of the brightness of the light reflected by the subject to the light image pickup device 16.

The video signal processing circuit 26 produces the processed composite video signal Sv' based on the video signal Sv supplied from the video signal generating circuit 22 and delivers the processed composite video signal Sv' to the output terminal 21.

When the shutter button 32 is operated at the time point $t_1$ the shutter signal Ss, as shown in FIG. 2A, is obtained from the shutter signal generating circuit 34 and supplied to the control signal generating circuit 14. The control signal generating circuit 14 then generates the mirror control signal Sm which rises to the predetermined high level at a time point $t_2$ coinciding with the rising edge of the first vertical synchronous signal Vs supplied from the synchronous signal generating circuit 24 after the time point $t_1$, that is, coinciding with the time point at which the next vertical blanking period $T_B$ in the video signal Sv as shown in FIG. 2E starts. The control signal generating circuit 14 thereafter keeps the signal Sm at the predetermined high level for a period $T_f$, corresponding to two fields, and then allows it to fall to the predetermined low level at a time point $t_3$, as shown in FIG. 2B.

The mirror control signal Sm shown in FIG. 2B, causes the mirror driving mechanism 13 to move the movable mirror 12 to the second position indicated with the double dot-dash line in FIG. 1 at the time point $t_2$, to stay thereat for the period of two fields thereafter and to return to the first position at the time point $t_3$. Simultaneously, the shutter driving mechanism 15 causes the shutter 19 to be opened for a predetermined period within the period Tf. Accordingly, in the period Tf, the light 0 from the subject having passed through the lens device 6 is reflected by the movable mirror 12 toward the photosensitive film 18a, without arriving at the light receiving surface of the image pickup device 16, and during the predetermined period within the period Tf in which the shutter 19 is opened such light is incident upon the photosensitive film 18a so that an image of the subject is formed thereon, that is, a photographic still image of the subject is obtained on the photosensitive film 18a.

During the period Tf, although the pickup output signal Sc can not be obtained, as shown in FIG. 2C, the mirror control signal Sm having the predetermined high level as shown in FIG. 2B is supplied to the memory control circuit 30 so that the reading pulse signal Pr is supplied to the memory 28 from the memory control circuit 30 and therefore the stored segment, i.e. two successive two field periods, of the pickup output signal Sc which was stored in the memory 28 just before the period Tf, is read from the memory 28 and is used as the supplemental pickup output signal Sc' as shown in FIG. 2D. The signal Sc' is supplied to the video signal generating circuit 22. Consequently, the video signal Sv is generated based on the supplemental pickup output signal Sc' in the video signal generating circuit 22 even in the period Tf, as shown in FIG. 2E, so that the video signal Sv obtained from the video signal generating circuit 22 is not interrupted.

After the time point $t_3$ at which the mirror control signal Sm falls to the predetermined low level, the movable mirror 12 is positioned again at the first position. Accordingly, the pickup output signal Sc is again obtained from the image pickup device 16 and is supplied to the video signal generating circuit 22. Each successive predetermined segment, corresponding to successive two field periods, of the pickup output signal Sc is again stored in the memory 28 in a manner such that each stored segment is replaced by a successive one.

As described above, the video signal Sv is continuously obtained from the video signal generating circuit 22 without being deteriorated in quality by interruptions even in the period Tf wherein the still image of the subject is formed upon the photosensitive film 18a. In this case, since the shift of the movable mirror 12 from the first position to the second position or vice versa is carried out in the period corresponding to the vertical blanking period TB in the video signal Sv obtained from the video signal generating circuit 22, the video signal Sv derived from the video signal generating circuit 22 is prevented from having undesirable variations resulting from the positional shifts of the movable mirror 12. Further, since no light splitter is provided in a path for the light 0 from the subject, the light 0 incident upon the light receiving surface of the image pickup device 16 or the photosensitive film 18a after having passed through the lens device 6 is not subjected to attenuation. Therefore, the minimum illuminance of the subject required for obtaining a video signal Sv properly representing the subject and proper photographic still images of the subject on the photosensitive film 18a is not increased, and as a result, the image of a subject in a relatively dark scene can be properly picked up by the image pickup device 16 and properly photographed on the photosensitive film 18a.

Figure 3:
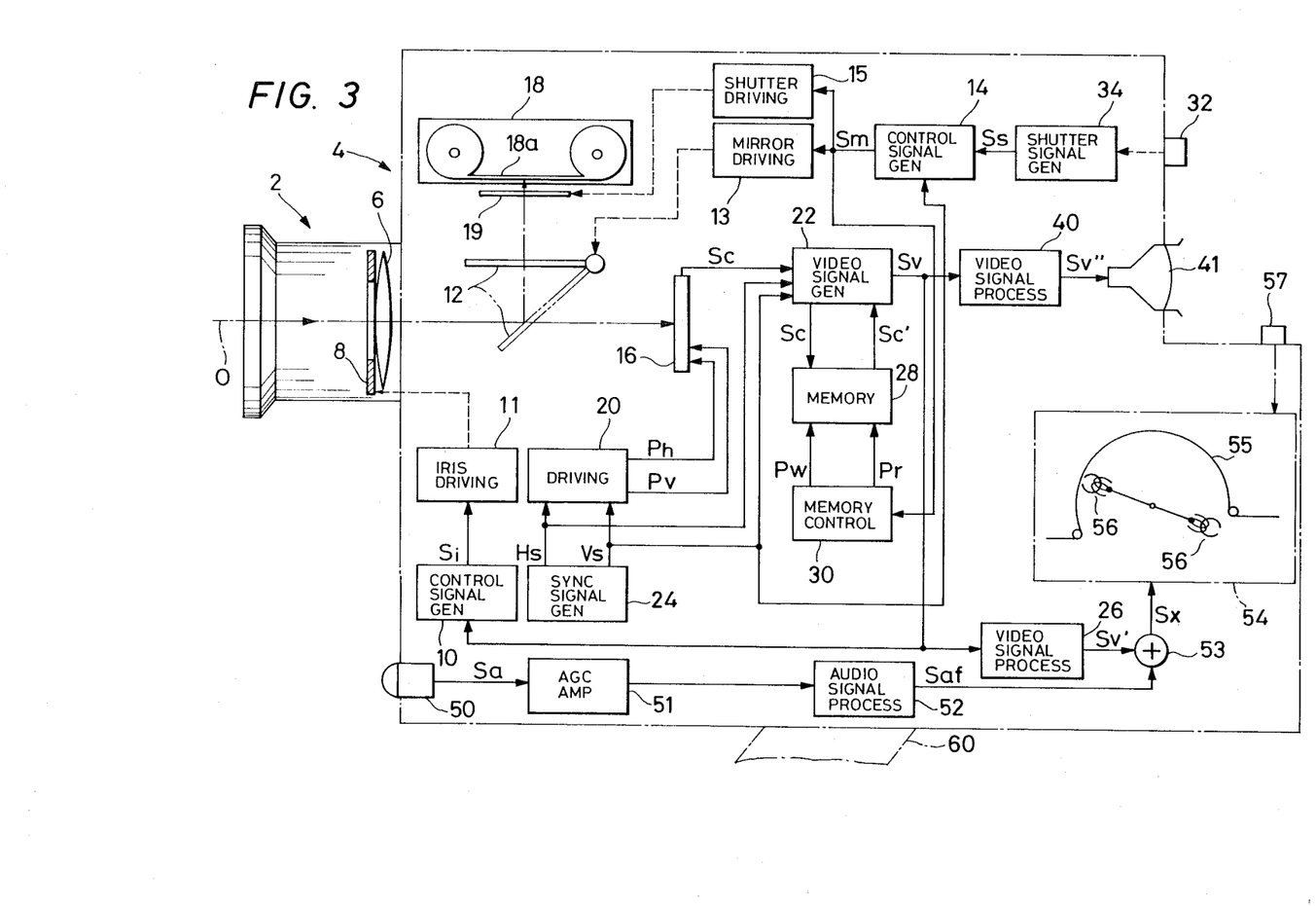
FIG. 3 is a block diagram showing another embodiment of composite camera apparatus according to the present invention.

FIG. 3 shows another embodiment of composite camera apparatus according to the present invention. In FIG. 3, elements, blocks and parts corresponding to those of FIG. 1 are marked with the same references and further description thereof will be omitted.

In the embodiment shown in FIG. 3, a video signal Sv obtained from a video signal generating circuit 22 is supplied, in addition to the video signal processing circuit 26, to another video signal processing circuit 40. The video signal processing circuit 40 produces a composite video signal Sv″ which is appropriate for display on a cathode ray tube based on the video signal Sv from the video signal generating circuit 22 and supplies the same to a cathode ray tube 41, so that a moving image of the subject is displayed on the cathode ray tube 41. Further, a processed composite video signal Sv′ obtained from the video signal processing circuit 26 is supplied to one input terminal of an adder 53.

In this embodiment, a microphone unit 50 is mounted on a body portion 4 to be relatively close to the lens 2. An audio signal Sa obtained from the microphone unit 50 is amplified by an automatic gain control amplifier (AGC amplifier) 51 and then supplied to an audio signal processing circuit 52. In the audio signal processing circuit 52, for example, the audio signal Sa amplified by the AGC amplifier 51 is used for frequency-modulating a predetermined carrier so as to generate a frequency-modulated audio signal Saf. This frequency-modulated audio signal Saf is supplied to the other of the input terminals of the adder 53, and a combined signal Sx containing the processed composite video signal Sv′ mixed with the frequency-modulated audio signal Saf and having, for example, frequency-spectrum characteristics suitable for recording by a compact video tape recorder used with a magnetic tape having a width of eight millimeters (8 mm VTR), is obtained at an output terminal of the adder 53.

The combined signal Sx derived from the adder 53 is supplied to a magnetic recorder 54 which is contained in the body portion 4 and operative to perform magnetic recording of signals in the same manner as an 8 mm VTR. In the magnetic recorder 54, the combined signal Sx supplied from the adder 53 is recorded on a magnetic tape 55 through each of a pair of rotary magnetic heads 56 scanning the magnetic tape 55 alternately to form oblique record tracks arranged successively. A recording button 57 is provided on the body portion 4 for activating the magnetic recorder 54. The bottom of the body portion 4 is also provided with a grip member 60.

Although the magnetic recorder 54 is contained in the body portion 4 in the above mentioned embodiment, the magnetic recorder 54 can also be arranged to be detachable from the body portion 4.

Further, although in each of the aforementioned embodiments, when the mirror 12 is in the first position, the pickup output signal Sc is supplied to the memory 28 so that each successive two field segment of the pickup output signal Sc is stored in the memory 28 until the next successive segment is stored in its place, it is to be understood that the invention is not limited thereto. In other embodiments, the video signal Sv can be supplied, instead of the pickup output signal Sc, to the memory 28 so that each predetermined segment of the video signal Sv, corresponding to successive two field periods, is stored in the memory 28, with each successive segment replacing the previously stored segment. In such an embodiment, in the period Tf wherein the movable mirror 12 is at the second position, the segment of the video signal Sv, corresponding to two successive field periods, which has been stored in the memory 28 just before the period Tf is read from the memory 28 and is supplied to the video signal generating circuit 22 and the video signal generating circuit 22 delivers the video signal Sv read from the memory 28 to the video signal processing block 26 or both the video signal processing blocks 26 and 40.

The invention as above described has been in reference to the preferred embodiments. In less advantageous embodiments the mirror 12 can be an immovable, beam splitting type mirror so that the camera does not require the mirror driver 13, the memory 28 or the memory control 30. As described above, in such a camera the film and video camera functions can take place simultaneously with the disadvantage being that there is a light loss to each of the camera functions due to the beam splitting mirror and therefore requiring greater illumination of the subject than would the camera of the preferred embodiment of the invention.

In another less advantageous embodiment, although the mirror 12 is movable, the memory 28 and memory control 30 are eliminated. The disadvantage with such an embodiment, as previously described, is that during the film camera operation no video signal is being delivered by the image pickup means 16 and thus the video signal generator must supply a video signal having a predetermined level, for example, a video signal of a gray level to the interrupted portion of the video signal.

In still another embodiment, the film camera and the video camera function independently of each other in the same camera body, with the lens means constituting two separate lenses for each camera function. In such an embodiment the elements 12, 13, 28, and 30 can be eliminated altogether.

Although the present invention has been shown and described with respect to preferred embodiments, various changes and modifications which are obvious to a person skilled in the art to which the invention pertains are deemed to lie within the spirit and scope of the invention.

What is claimed is:

1. A composite camera apparatus comprising:

lens means upon which light from a subject is incident;

film holding means for supporting a photosensitive film upon which an image of the subject is formed by the light having passed through said lens means;

image pickup means provided with a light receiving surface upon which an image of the subject is formed by the light having passed through said lens means for producing a pickup output signal in response to the image formed upon the light receiving surface;

video signal generating means connected to said image pickup means for continuously producing a video signal based on the pickup output signal obtained from said image pickup means, even when a photographic image is being formed upon the film;

video signal processing means connected to said video signal generating means for producing a processed video signal appropriate for magnetic recording based on said video signal; and wherein the light is unattenuated in passing from the lens means to said film and said image pickup means.

2. A composite camera apparatus according to claim 1 further comprising magnetic recording means contained within the camera and connected to said video signal processing means for recording said processed video signal on a magnetic tape.

3. A composite camera apparatus comprising:

lens means upon which light from a subject is incident;

a film holder for supporting a photosensitive film upon which an image of the subject is formed by the light having passed through said lens means;

an image pickup means provided with a light receiving surface upon which an image of the subject is formed by the light having passed through said lens means for producing a pickup output signal in response to the image formed upon the light receiving surface;

a movable mirror selectively positionable at a first position for permittng the light having passed through said lens means to be incident upon said light receiving surface of the image pickup means and at a second position for permitting the light having passed through said lens means to be incident upon said photosensitive film, and wherein said mirror control means is selectively operable by the user of the camera to cause said movable mirror to be positioned at said second position in synchronism with the occurrence of the next vertical blanking period in said video signal after the user causes the mirror control means to be operable; and video signal generating means connected to said image pickup means for continuously producing a video signal based upon the pickup output signal obtained from said image pickup means.

4. A composite camera apparatus comprising:

lens means upon which light from a subject is incident;

a film holder for supporting a photosensitive film upon which an image of the subject is formed by the light having passed through said lens means;

an image pickup means provided with a light receiving surface upon which an image of the subject is formed by the light having passed through said lens means for producing a pickup output signal in response to the image formed upon the light receiving surface;

a movable mirror selectively positionable at a first position for permitting the light having passed through said lens means to be incident upon said light receiving surface of the image pickup means and at a second position for permitting the light having passed through said lens means to be incident upon said photosensitive film; and video signal generating means connected to said image pickup means for continuously producing a video signal based upon the pickup output signal obtained from said image pickup means; and memory means operative to electronically store each successive predetermined segment of the pickup output signal obtained from said image pickup device in such a manner that each successive stored segment replaces the previously stored segment when said movable mirror is positioned at said first position and to permit the last stored segment to be read therefrom when said movable mirror is positioned at said second position.

5. A composite camera apparatus according to claim 4 wherein said predetermined segment of the pickup output signal is two successive fields.

6. A composite camera apparatus according to claim 4 and further comprising:

mirror control means selectively operative by the user of the camera to cause said movable mirror to be positioned at said second position in synchronism with a period which corresponds to the next vertical blanking period in a video signal derived from said pickup output signal and occurring after the user causes the mirror control means to position the mirror at the second position.

7. A composite camera apparatus comprising:

lens means upon which light from a subject is incident;

a film holder for supporting a photosensitive film upon which an image of the subject is formed by the light having passed through said lens means;

an image pickup means provided with a light receiving surface upon which an image of the subject is formed by the light having passed through said lens means for producing an output signal in response to the image formed upon the light receiving surface;

a movable mirror selectively positionable at a first position for permitting the light having passed through said lens means to be incident upon said light receiving surface of the image pickup means and at a second position for permitting the light having passed through said lens means to be incident upon said photosensitive film;

mirror control means selectively operative by the user of the camera to cause said movable mirror to be positioned at said second position in synchronism with a period which corresponds to the next vertical blanking period in said image pickup means output signal and occurring after the user causes the mirror control means to position the mirror at the second position;

memory means operative to store each successive predetermined segment of said image pickup means output signal in such a manner that each segment is replaced by the next successive one when said movable mirror is positioned at said first position and to permit the segment stored therein to be read therefrom when said movable mirror is positioned at said second position; and video signal generating means connected to said image pickup means and said memory means for reading the segment stored in the memory means and for producing a video signal based upon said image means pickup output signal and the segment read from said memory means.

8. A composite camera apparatus according to claims 3, 4 or 7 further comprising video signal processing means connected to said video signal generating means for producing a processed video signal appropriate for magnetic recording based on said video signal.

9. A composite camera apparatus according to claim 8 further comprising magnetic recording means connected to said video signal processing means for recording said processed video signal on a magnetic tape.

10. A composite camera apparatus according to claim 8 further comprising audio signal generating means for producing an audio signal, audio signal processing means for producing a processed audio signal appropriate for magnetic recording based on said audio signal, and adding means for mixing said processed audio signal with said processed video signal so that said processed audio signal is recorded together with said processed video signal.

* * * * *